US006937625B2

(12) United States Patent
Colombo et al.

(10) Patent No.: US 6,937,625 B2
(45) Date of Patent: Aug. 30, 2005

(54) METHOD AND DEVICE FOR CONVERTING AN STM-1 SIGNAL INTO A SUB-STM-1 SIGNAL AND VICE-VERSA IN RADIO TRANSMISSION

(75) Inventors: Claudio Colombo, Biassono (IT); Primo Garofoli, Milan (IT); Giuseppa Licata, Segrate (IT); Alberto Lometti, Merate (IT)

(73) Assignee: Alcatel, Paris (FR)

( * ) Notice: Subject to any disclaimer, the term of this patent is extended or adjusted under 35 U.S.C. 154(b) by 570 days.

(21) Appl. No.: 09/741,074

(22) Filed: Dec. 21, 2000

(65) Prior Publication Data

US 2001/0004358 A1 Jun. 21, 2001

(30) Foreign Application Priority Data

Dec. 21, 1999 (IT) .......................................... MI99A2653

(51) Int. Cl.$^7$ ................................................. H04J 3/02
(52) U.S. Cl. ........................................ 370/537; 370/542
(58) Field of Search ................................ 370/466–468, 370/401–408, 410, 471, 496, 522, 531–538, 441–442, 352, 389–392, 503–505, 539; 714/724, 738, 744

(56) References Cited

U.S. PATENT DOCUMENTS

| | | | | |
|---|---|---|---|---|
| 5,282,206 A | * | 1/1994 | Ishihara et al. ............. | 370/509 |
| 5,416,768 A | * | 5/1995 | Jahromi ...................... | 370/360 |
| 5,432,796 A | * | 7/1995 | Borschel et al. ............ | 714/736 |
| 5,457,691 A | * | 10/1995 | Romeijn ...................... | 370/510 |
| 5,481,547 A | * | 1/1996 | Sasaki et al. ............... | 370/505 |
| 5,675,585 A | * | 10/1997 | Bonnot et al. .............. | 714/701 |
| 5,956,347 A | * | 9/1999 | Slater ......................... | 370/503 |
| 5,963,873 A | * | 10/1999 | Suzuki ....................... | 455/560 |
| 6,061,329 A | * | 5/2000 | Abe ........................... | 370/228 |
| 6,094,737 A | * | 7/2000 | Fukasawa ................... | 714/738 |
| 6,556,593 B1 | * | 4/2003 | Herkersdorf et al. ....... | 370/532 |
| 6,633,584 B1 | * | 10/2003 | Russell et al. .............. | 370/466 |
| 6,693,902 B1 | * | 2/2004 | Sahlman et al. ............ | 370/369 |

OTHER PUBLICATIONS

ITU–T Recommendation G.707, Series G: Transmission Systems and Media, Mar. 1996, pp. 1–128.

* cited by examiner

*Primary Examiner*—Kenneth Vanderpuye
*Assistant Examiner*—Van Kim T. Nguyen
(74) *Attorney, Agent, or Firm*—Sughrue Mion, PLLC

(57) ABSTRACT

A method and device is described for converting an STM-1 signal into a sub-STM-1 signal in synchronous radio transmission. The invention provides for the use of a pure regenerator network element without any multiplexing function. The method according to the invention provides in transmission, for reducing the received STM-1 signal by one third (only the first TUG-3 is considered as valid and is transmitted in the radio link, whereas the second and the third TUG-3 are considered in an unequipped condition and are not transmitted), thus maintaining the STM-1 structure. In reception, the method provides for reconstructing the signal with the complete regenaration of the payload and the correct structure of the AU-4 without incurring any parity control infringement.

10 Claims, 6 Drawing Sheets

Where:

Y=10010011
U=11111111

Fixed stuffing bytes

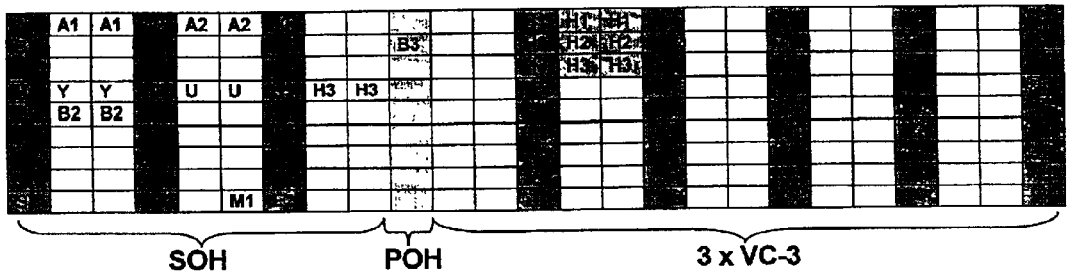
Fig. 6a
Fig. 6b
Fig. 6c
Fig. 6d
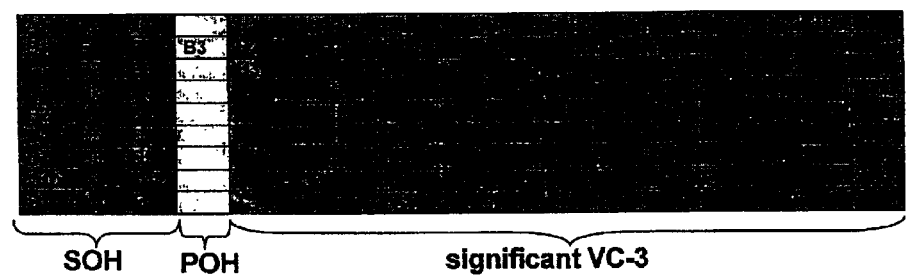
Fig. 6e

METHOD AND DEVICE FOR CONVERTING AN STM-1 SIGNAL INTO A SUB-STM-1 SIGNAL AND VICE-VERSA IN RADIO TRANSMISSION

BACKGROUND OF THE INVENTION

1. Field of the Invention

The present invention relates to the field of synchronous radio telecommunications. In particular it concerns a method and a corresponding device which is able to transmit/convert synchronous signals with a bit rate significantly below that of an STM-1 signal.

2. Description of the Prior Art

As it is known from ITU-T Recommendation G.707, a synchronous transport module (STM) is the information structure used to support connections at section layer in the SDH (Synchronous Digital Hierarchy) transmissions. Each STM comprises Payload and Section Overhead (SOH) information fields organized in a block frame structure which repeats every 125 μs. The information is suitably conditioned for serial transmission on the selected media at a rate which is synchronized to the network. A basic STM structure is defined at 155,520 Kbit/s and is termed STM-1. Each STM-1 comprises a single AUG (Administrative Unit group) together with the Section Overhead.

In various network practical applications, it is not necessary to transport a complete STM-1 and often the bandwidth of the radio channels is too small to support full STM-1 transmission. Therefore, for applications based on such limited-band radio channels, a synchronous signal format with a bit rate significantly below an STM-1 signal is useful.

Within the activity carried out by the standardization entities (ITU-R and ETSI) operating in the field of radio communication, such a signal format has been developed and the approval of ITU-T has been achieved. The signal in question, termed "sub-STM-1 signal", provides one third of the capacity of an STM-1 signal and maintains most of the benefits of the synchronous transmission. In essence, an interface called "Sub-STM-1" is provided which allows the transport of a VC-3 (Virtual Container-3) in an AUG based upon an AU-3 (Administrative Unit-3).

This new sub-STM-1 interface is not a Network Node Interface (NNI) in ETSI market and thus it is necessary for the radio network element (NE) to have an STM-1 interface and the capability to perform an STM-1 to sub-STM-1 signal conversion to transmit over radio channel. Naturally, the STM-1 signals in these instances are considered as only partially filled i.e. they carry only an "equipped" VC-3.

It is therefore apparent that with this known solution a radio NE must carry out a series of operations among which: a demultiplexing operation with an ADM or a DEMUX; a pointer processing operation through an appropriate algorithm; a parity calculation operation; and, lastly, a new multiplexing operation to sub-STM-1. Clearly, all these operations cannot be carried out in a "pure regenerator" NE and an ADM or MUX/DEMUX apparatus should be added.

In other words, the existing solution for interconnecting an STM-1 with a sub-STM-1 utilizes the interconnection rules between AUGs based upon a different type of Administrative Unit AU-4 and AU-3. This method requires that the AU-4 is demultiplexed to the Virtual Container VC-3 or TUG-2 level according to the type of the payload, and remultiplexed within an AUG via VC-3/AU-3 path. The known method is illustrated in FIGS. 1a (interconnection of VC-3 with C3 payload) and 1b (interconnection of TUG-2), as in the ITU-T Recommendation G.707.

SUMMARY OF THE INVENTION

In view of the state of the art illustrated above and of the related drawbacks, the main object of the invention is to provide a method and an apparatus for transmitting/receiving radio signals at 51 Mbit/s without carrying out demultiplexing operations on the STM-1 interface signal and therefore without having to use expensive ADM or MUX/DEMUX apparatus in addition to the radio set proper.

This and further objects are achieved by means of a method having the features set forth in the independent claim 1 and an apparatus having the characteristics set forth in the independent claim 7. Further advantageous characteristics of the method and of the apparatus are set forth in the respective dependent claims. All the claims are however considered an integral part of the present description.

Through the arrangement according to the present invention, it is possible to transmit a sub-STM-1 and achieve the object of using a radio NE as a regenerator instead of a MUX/DEMUX. With the present invention, an operation of frame reduction by one third at regenerator section level is performed in transmission. In reception, the reverse operation of frame recomposition is carried out.

The basic idea of the present invention is to reduce by one third the received STM-1 signal (only the first TUG-3 is considered valid and is transmitted in the radio link while the second and the third TUG-3s are considered in an unequipped condition and therefore they are not transmitted) thus maintaining the STM-1 structure (AUG based on AU-4). In reception, the signal is reconstructed with the complete regeneration of the payload and the correct AU-4 structure without incurring any parity check violation at Multiplex Section and path level.

The invention will certainly result in being clear in view of the following detailed description, given by way of a mere non limiting example, to be read with reference to the attached drawing sheets.

BRIEF DESCRIPTION OF THE DRAWINGS

In the drawings:

FIGS. 6a through 6e show some operations performed on the frame for the STM-1 to sub-STM-1 conversion.

DESCRIPTION OF THE BEST MODE FOR CARRYING OUT THE INVENTION

It is a good thing to point out at this stage that, notwithstanding in the present description reference is often made to the SDH synchronous transmission for the sake of clarity, the present invention is likewise applicable to other types of synchronous transmission such as e.g. the SONET. Therefore, the reference to the SDH transmission, in this patent application, must be understood in a broad sense not restricted to its specific meaning.

As said beforehand above, according to the present invention a frame reduction to one third at Regeneration Section level is carried out. The basic idea of the present invention is to reduce by one third the received STM-1 signal (only the first TUG-3 is considered valid and is transmitted in the radio link while the second and third TUG-3s are considered in a unequipped condition and hence deemed non-significant) while maintaining the STM-1 structure (AUG based on AU-4). In reception, the signal is constructed with the complete payload regeneration and the correct AU-4 structure without incurring any parity check violation.

Figure 1A:
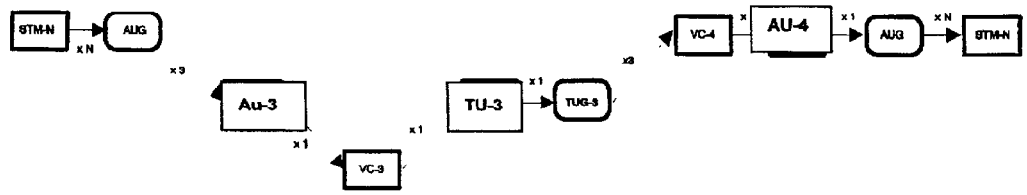
FIG. 1a illustrates the known solution for the interconnection of an STM-1 with a sub-STM-1 and in particular the interconnection of a VC-3 with C-3 payload.
Figure 1B:
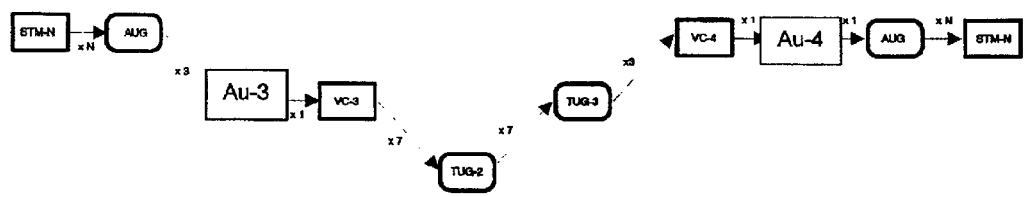
FIG. 1b illustrates the known solution for the interconnection of an STM-1 with a Sub-STM-1 and in particular the interconnection of a TUG-2.
Figure 2:
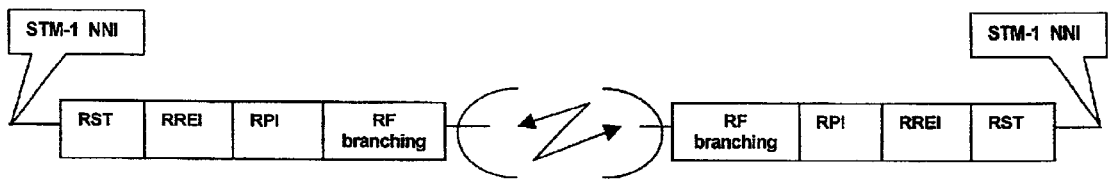
FIG. 2 shows a functional block diagram of two sub-STM-1 terminals illustrating where the interface is positioned according to the present invention.
Figure 3:
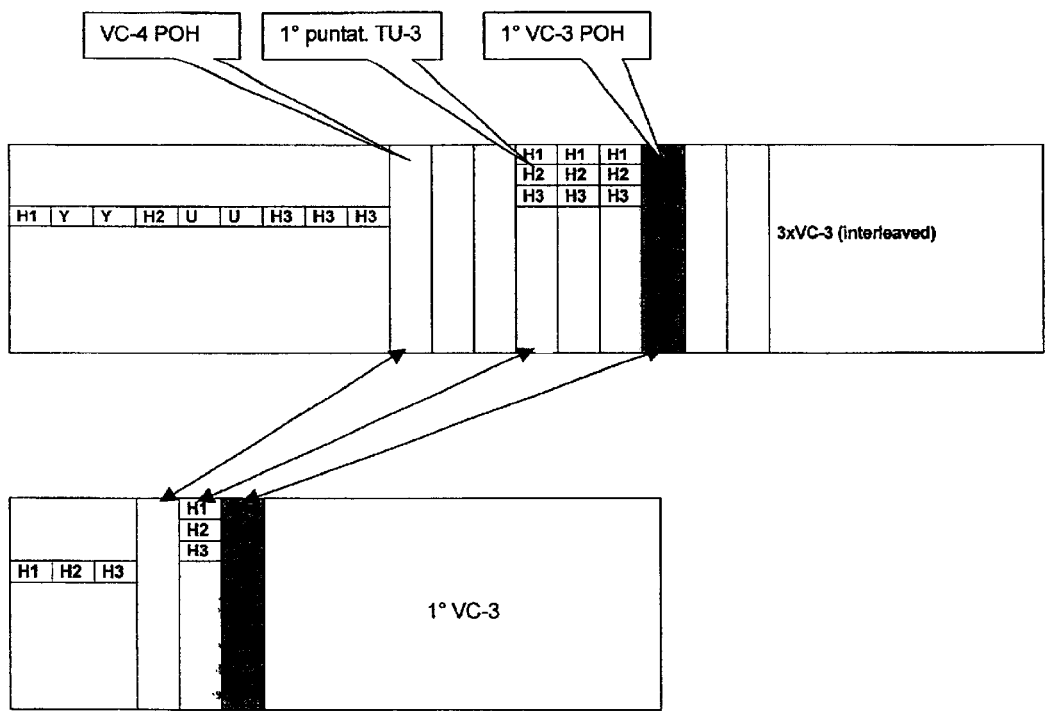
FIG. 3 shows an STM-1 multiplex structure with three TUG-3s carrying a virtual container VC-3 within an AU-4 unit.
Figure 3:

Reference is to be made first to FIG. 2 that schematically depicts two terminals of the sub-STM-1 interface and shows where the interface is positioned in accordance with the present invention. In this figure, NNI designates a Network Node Interface, RST a Regeneration Section Termination, RREI a Radio-Relay Equipment Interface (substantially the present invention) and RPI a Radio Physical Interface.

In FIG. 2 (from STM-1 interface NNI to interface RPI side), an STM-1 signal coming into a radio network element (NE) of the SDH regenerator type, is reprocessed in order to form a new sub-STM-1 signal at a bit rate of about 51 Mbit/s. The incoming STM-1 signal contains an AU-4 structure formed by one TUG-3 able to carry a VC-3 (or seven TUG-2s, each containing three X TU-12) and two TUG-3s with the unequipped VC-3s. The incoming STM-1 signal is reprocessed as follows:

1. the RSOH (Regenerator Section Overhead) of STM-1 is terminated and the corresponding RSOH is generated in the new STM frame;

2. all the significant MSOH bytes (bytes B2, K1, K2, D4–D12, S1, M1 and E2) are recovered and retransmitted in the new STM frame without performing any Multiplex Section termination function, but paying attention to make the right compensation in order for that radio network element to seem transparent with respect to these bytes;

3. the Path Over Head (POH) of the VC-4 is retransmitted in a transparent way;

4. the TU-3 (Tributary Unit-3) pointers are rewritten for the second and third VC-3s, that are unequipped, with a valid pointer value and a pointer offset equal to zero;

5. the first TUG-3 (Tributary Unit Group(-3)) containing the significant information is retransmitted in a transparent way; and 6. the second and third TUG-3s (the unequipped ones) are discarded.

Because of the introduction of the new TU-3 pointer values and because of the fact that some bytes (some MSOH bytes and the two unequipped TUG-3s) are discarded, the parity (BIP, Bit Interleaved Parity) checks on bytes B2 and B3 are to be compensated. A known way to carry out such compensation may advantageously be implemented through the algorithm described in the above-cited ITU-T Recommendation G.707 and in particular in the Annex C (Tandem Connection Monitoring Protocol).

The M1 byte of the STM-1 frame which, as it is known acts as a remote error indication in the Multiplex Section and is conventionally located at the #9.6 (ninth row, sixth column) position of the frame, is rewritten at the #9.4 position in order to maintain the information within the transmitted frame. Once the above operations have been carried out, the frame can be reduced to one third of its capacity as will be clear from the detailed description of the various steps herebelow.

Consider now the opposite side (the one at which the transmitted sub-STM radio signal is received) namely, the one from the RPI interface to the STM-1 NNI interface. The sub-STM-1 signal from a radio regenerator is interleaved with null information (all zeros) and changed to the standard format of an STM-1 signal. The alignment word is refreshed and the AU-4 pointer is rewritten. The M1 byte, whose position had been changed, is reallocated in the correct position (#9.6). The TU-3 pointers are rewritten for the second and third unequipped VC-3s with a new valid pointer value and pointer offset equal to zero.

As will be clear now, the most significant advantage of the new solution is the possibility of transmitting, via conventional radio equipment, only the significant portion of an STM-1 signal that is sub-equipped. This occurs without carrying out any multiplexing/demultiplexing or pointer processing operation but by utilizing the radio network element as a pure regenerator network element.

Figure 4:
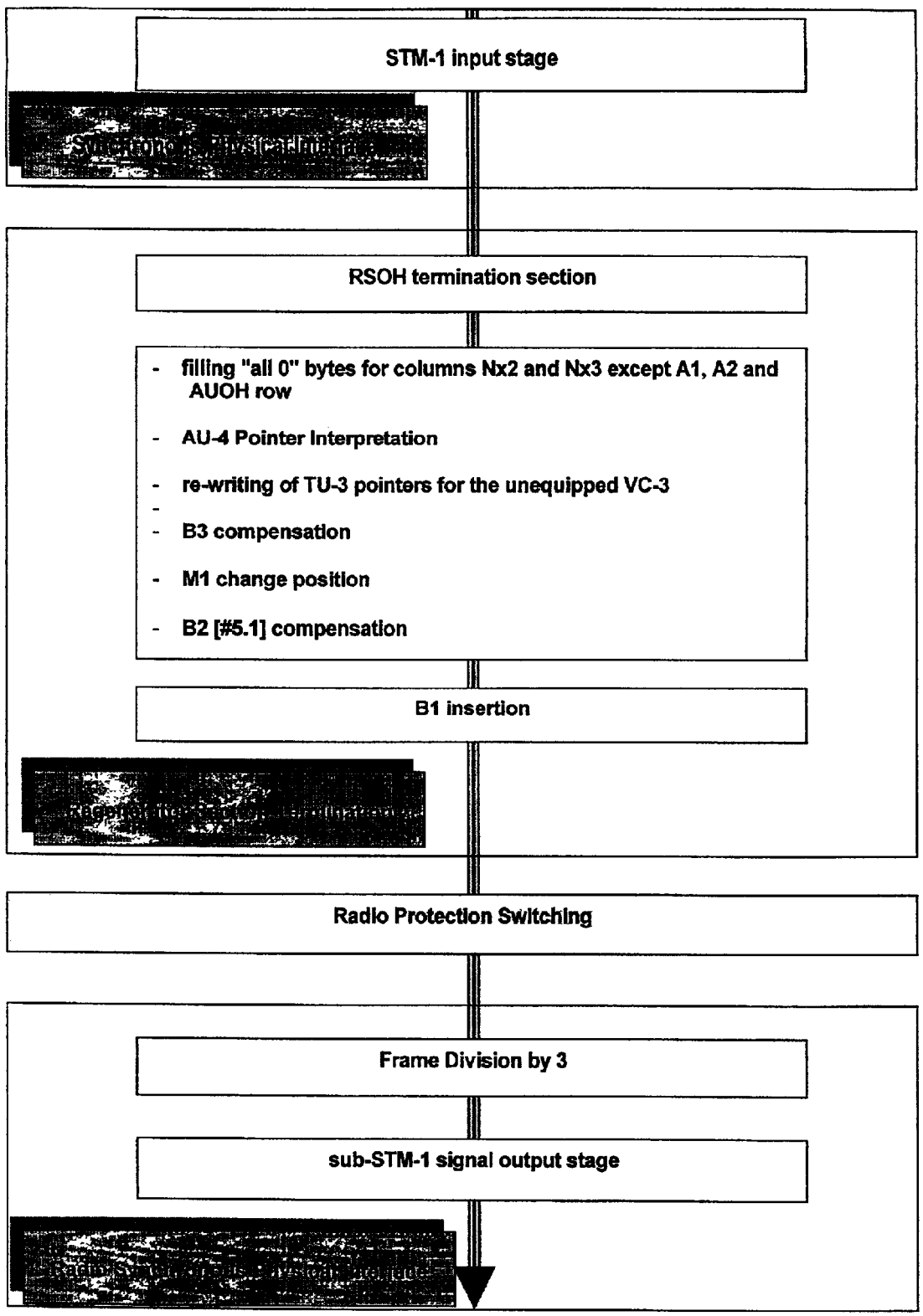
FIG. 4 shows a block diagram of the algorithm processing the frame from STM-1 to sub-STM-1.

Referring now to FIG. 4 and to the various FIGS. 6a to 6e, the STM-1 to sub-STM-1 module conversion will now be illustrated in detail. The following operations will be performed on an STM-1 standard signal.

a) Regeneration section termination on STM-1 b) Regeneration section generation on sub-STM-1 (FIG. 6a)

c) Filling "all zeros" bytes in all the columns which are multiple of two and three (NX2 and NX3, N=1,2,3 . . . ) except for AUOH row and alignment word A1 and A2. For clarity, the columns in FIGS. 6a to 6d that are not filled with zeros are blackened i.e.—darker.

d) Filling "all zeroes" in the #9.4 (ninth row, fourth column) byte, as depicted in FIG. 6b.

e) Through a pointer interpretation machine, performing an AU-4 pointer interpretation (to identify the position of byte B3 and the starting position of the AU-4 in order to determine the position of the TU-3 pointers).

f) Rewriting the TU-3 pointers in the second and third unequipped VC-3s as valid pointer value pointer offset equal to zero. In the case of three VC-3 mapped structure, the TU-3 pointer values for the second and third uncharged containers in the incoming frame are fixed to the value

H1 H2 H3=01101000 00000000 00000000 (EXADEC: 68 00 00)

NDF=10

SS_bits=10 pointer value=0 (see FIG. 6c)

g) B3 byte correction/compensation; operation which is necessary, having inserted the new TU-3 pointer values and the columns with all zeros.

h) Rewriting of byte M1 in the new #9.4 (ninth row, fourth column) position as in FIG. 6d.

i) B2 byte correction/compensation (in the #5.1 position) as a function of the new B3 value inserted.

j) Insertion of byte B1 (parity recalculation).

k) Reduction of columns (for the sub-STM-1 frame to be transmitted).

l) Generation of the regeneration section on appropriate sub-STM-1 interface (FIG. 6e). In FIG. 6e, the first three columns correspond to the SOH, the fourth column to the POH while the other columns are substantially the significant VC-3.

Figure 5:
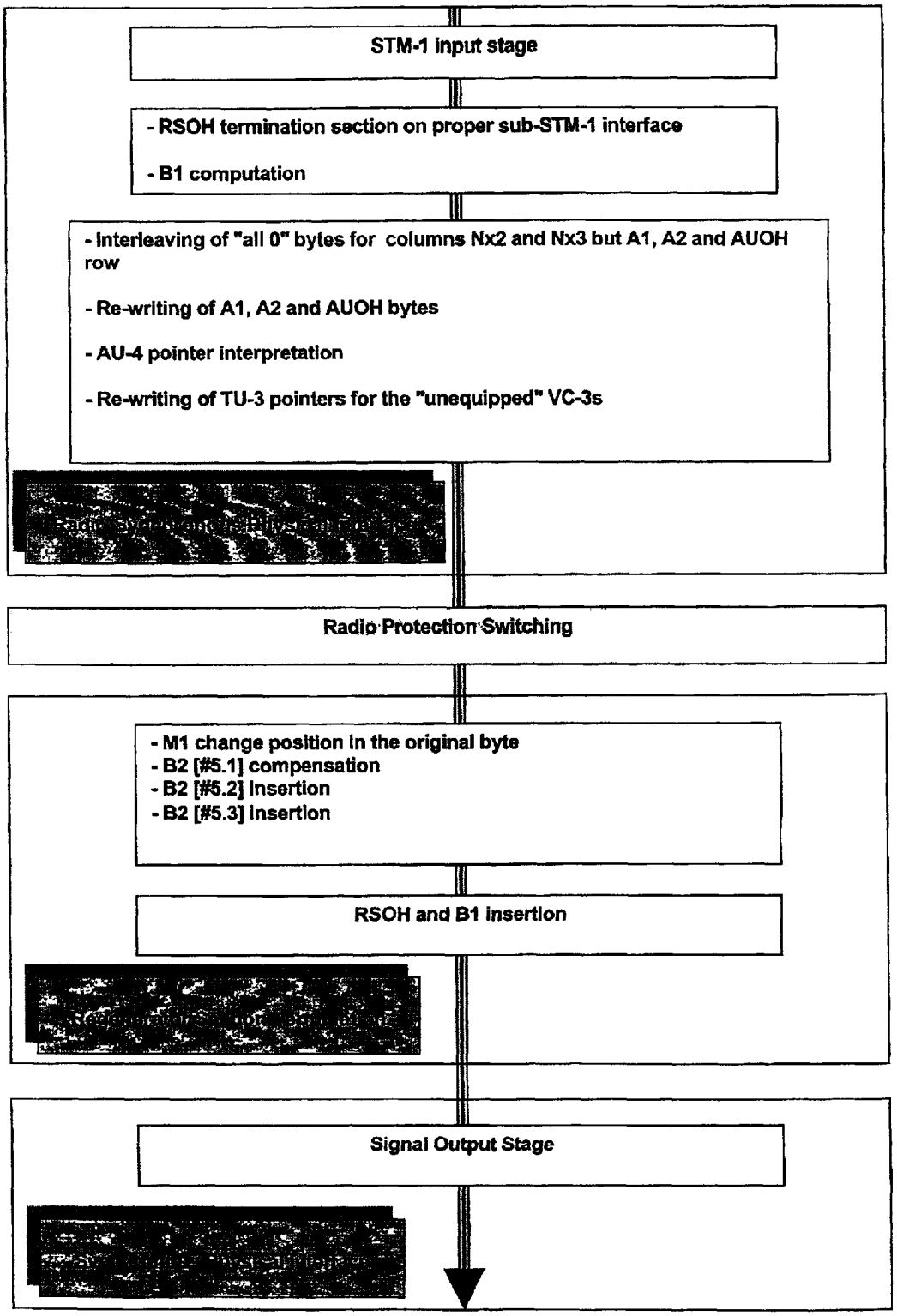
FIG. 5 shows a block diagram of the frame processing algorithm from sub-STM-1 to STM-1.
Figures 7A, 7B, 7C, 7D:
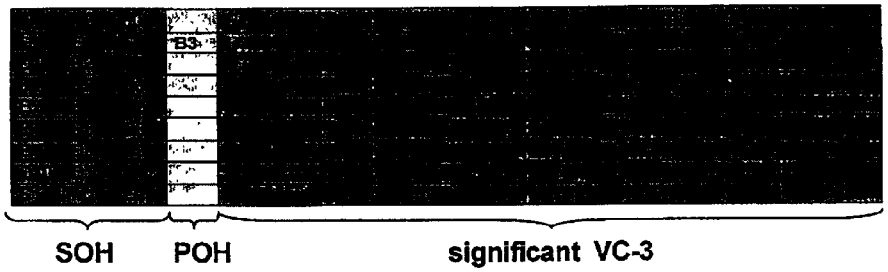
FIGS. 7a through 7d show some operations performed on the frame for the sub STM-1 conversion.

Referring now to FIG. 5 and to the various FIGS. 7a to 7d, the sub-STM-1 signal conversion will now be illustrated in detail. The following operations are performed on a standard sub-STM-1 signal.

m) Regeneration Section termination on appropriate sub-STM-1 interface.

n) B1 computation (FIG. 7a).

o) Reconstruction of columns multiple of two and of three (NX2 and NX3, N=1,2,3, . . . ) with all zeros stuffing bytes (as in FIG. 7b).

p) Rewriting the correct alignment word A1, A2 (EXADEC=F6 F6 F6 28 28 28) and the entire RSOH.

q) Rewriting the correct AUOH row (fourth row)

AU pointer=H1 Y Y H2 U U H3 H3 H3 where

Y=1001 0011 (EXADEC=93)

U=1111 1111 (EXADEC=FF)

r) Rewriting of the M1 byte in the correct position (#9.6) of the STM-1 frame.

s) Filling with all zeros in the #9.4 byte (FIG. 7c).

t) Carrying out an AU-4 pointer interpretation (to identify the AU-4 starting position in order to determine the exact position of the TU-3 pointers) through a pointer interpretation machine.

u) Rewriting the TU-3 pointers for the second and third unequipped VC-3s as valid pointers and pointer offset equal to zero. In the case of a structure mapped with three VC-3, the TU-3 pointer values for the second and third uncharged containers in the incoming frame are fixed to the following values:

H1 H2 H3=01101000 00000000 00000000 (EXADEC 68 00 00)

NDF=0110; SS_bits=10 pointer value=0 v) B2 byte processing. The processing step comprises the following substeps:

B2 byte (#5.1) correction/compensation due to the replacement of the M1 byte with an "all zeroes" configuration in the #9.4 position;

B2 (#5.2) is set equal to Y $\Theta$ U $\Theta$ H3 $\Theta$ H1 (TU-3 pointer), where "$\Theta$" designates the exclusive OR logical operator;

B2 (#5.3) is set equal to Y $\Theta$ U $\Theta$ H3 $\Theta$ M1 $\Theta$ H1 (TU-3 pointer), where $\Theta$ designates the exclusive OR logical operator.

w) Insertion of RSOH and B1 (FIG. 7e).

The method according to the invention could be implemented by a suitable device or apparatus, in this case a network element and/or an interface comprising means able to carry out all of the steps of the method itself or, as an alternative, the method could be implemented by means of a suitable computer program, said program comprising computer program code means adapted to perform all the steps of the method when said program is run on a computer. The protection is intended as tacitly extended, in addition to such a program, also to a computer readable medium having such a program recorded thereon. In particular, the invention could advantageously be implemented by means of an ASIC.

Naturally, many of the steps detailed above could be performed with some variations or could also be eliminated. However, such modifications, considered apparent to a person skilled in the art having read the above description, are held as falling within the scope defined by the following claims.

What is claimed is:

1. A method for converting an STM-1 signal into a sub-STM-1 signal and vice versa in a synchronous radio transmission system, the method comprising:

receiving the STM-1 signal or the sub-STM-1 signal; and regenerating the received signal by a radio network element, without performing any multiplexing function, wherein said regenerating the received signal comprises the steps of:

in Transmission, reducing by one third the received STM-1 signal, said received STM-1 signal comprising three TUG-3s with only the first TUG-3 being considered valid and being transmitted in the radio link while the second and the third TUG-3s being considered in an unequipped condition and therefore being not transmitted so as to maintain in this way the STM-1 structure; and in Reception, reconstructing the signal with the complete regeneration of the payload, the correct AU-4 structure, of the Section Overhead without incurring any parity check violation both at Multiplex Section level and at path level.

2. A method according to claim 1, wherein, in transmission, it comprises the steps of:

terminating the STM-1 RSOH and generating the corresponding RSOH in the new STM frame;

recovering all the significant MSOH bytes (B2, K1, K2, D4–D12, S1, M1, E2) and re-transmitting them in the new STM frame without performing any Multiplex Section termination function but paying attention to carry out the correct compensation in order for that radio network element to be transparent with respect to those bytes;

re-transmitting the VC-4 Path Overhead (POH) in a transparent way;

rewriting the Tributary Unit-3 (TU-3) pointers for the second and third unequipped VC-3s with a valid pointer value and pointer offset equal to zero;

re-transmitting in a transparent way the first TUG-3 (Tributary Unit Group(-3)) containing the significant information; and eliminating the second and third unequipped TUG-3s.

3. A method according to claim 1, wherein, in reception, it comprises the steps of:

interleaving the sub-STM-1 signal coming from a radio regenerator with null-information and changing it in a standard dimension of an STM-1 signal;

refreshing the alignment word and rewriting the AU-4 pointer;

reallocating a remote error indication in the Multiplex section (M1 byte), whose position had been changed, in the correct position of a $9^{th}$ row, $6^{th}$ column position of a frame; and rewriting the TU-3 pointers for the second and third unequipped VC-3s with a new valid pointer value and pointer offset equal to zero.

4. A method according to claim 2, wherein, in transmission, the STM-1 to sub-STM-1 module conversion implies the carrying out of the following operations:

a) Regeneration Section termination on the STM-1;

b) Regeneration Section termination on sub-STM-1;

c) filling all zero bytes for all the columns multiple of two and of three except the AUOH row and framing alignment word bytes (A1 and A2);

d) filling all zeros in the byte at the position corresponding to the ninth row, fourth column;

e) carrying out an AU-4 pointer interpretation to identify the position of a B3 byte, allocated for a path error monitoring function, and the AU-4 starting position in order to determine the TU-3 pointer position;

f) rewriting the TU-3 pointers for the second and third unequipped VC-3s as valid pointer value and pointer offset equal to zero;

g) B3 byte correction/compensation;

h) rewriting the M1 byte in the new position at ninth row and fourth column of the frame;

i) B2 byte, allocated for multiplex section error monitoring function, correction/compensation as a function of the inserted B3 new value;

j) B1 byte, allocated for regeneration section error monitoring, insertion and parity re-calculation;

k) column reduction for the sub-STM-1 frame to be transmitted; and l) regenerator section generation on proper sub-STM-1 interface.

5. A method according to claim 3, wherein, in reception the sub-STM-1 to STM-1 module conversion implies the carrying out of the following operations:

m) Regeneration Section termination on proper sub-STM-1 interface;

n) B1 computation, said B1 being a byte allocated for regeneration section error monitoring;

o) reconstruction of the columns multiple of two and of three with all zero stuffing bytes;

p) rewriting of the correct frame alignment word bytes (A1 and A2) and of the entire RSOH;

q) rewriting of the correct AUOH row;

r) rewriting of the a remote error indication byte in the Multiplex section (M1 byte) in the correct position corresponding to the $9^{th}$ row, $6^{th}$ column position of the STM-1 frame;

s) filing all zeros in the byte corresponding to the position in the $9^{th}$ row, $4^{th}$ column of the frame;

t) AU-4 pointer interpretation;

u) rewriting of the TU-3 pointers for the second and third unequipped VC-3s as valid pointers and pointer offset equal to zero;

v) B2 byte processing, the B2 byte being allocated for multiplex section error monitoring function; and w) RSOH and B1 insertion, the B1 byte being allocated for regeneration section error monitoring.

6. A device for converting an STM-1 signal into a sub-STM-1 signal in synchronous radio transmission, said device comprises:

receiving means for receiving an STM-1 signal or a sub-STM-1 signal;

a pure regenerator network element (NE) regenerating the received signal without any multiplexing function;

one or more modules for carrying steps of:
receiving the STM-1 signal or the sub-STM-1 signal; and
regenerating the received signal by a radio network element, without performing any multiplexing function, wherein said step of regenerating the received signal comprises the steps of:
in Transmission, reducing by one third the received STM-1 signal, said received STM-1 signal comprising three TUG-3s with only the first TUG-3 being considered valid and being transmitted in the radio link while the second and the third TUG-3s being considered in an unequipped condition and therefore being not transmitted so as to maintain in this way the STM-1 structure; and in Reception, reconstructing the signal with the complete regeneration of the payload, the correct AU-4 structure, of the Section Overhead without incurring any parity check violation both at Multiplex Section level and at path level, said reconstructing step further comprises steps of:

Regeneration Section termination on proper sub-STM-1 interface;

B1 computation, said B1 being a byte allocated for regeneration section error monitoring;

reconstruction of the columns multiple of two and of three with all zero stuffing bytes;

rewriting of the correct frame alignment word bytes (A1 and A2) and of the entire RSOH;

rewriting of the correct AUOH row;

rewriting of the a remote error indication byte in the Multiplex section (M1 byte) in the correct position corresponding to the $9^{th}$ row, $6^{th}$ column position of the STM-1 frame;

filing all zeros in the byte corresponding to the position in the $9^{th}$ row, $4^{th}$ column of the frame;

AU-4 pointer interpretation;

rewriting of the TU-3 pointers for the second and third unequipped VC-3s as valid pointers and pointer offset equal to zero;

B2 byte processing, the B2 byte being allocated for multiplex section error monitoring function; and RSOH and B1 insertion, the B1 byte being allocated for regeneration section error monitoring.

7. A computer program product run on a computer, comprising code adapted to perform the steps of:

receiving the STM-1 signal or the sub-STM-1 signal; and regenerating the received signal by a radio network element the step of providing a radio network element (NE), wherein the step of providing a radio network element (NE) comprises the step of providing a pure regenerator network element, without performing any multiplexing function, wherein said step of regenerating the received signal comprises the steps of:
in Transmission, reducing by one third the received STM-1 signal, said received STM-1 signal comprising three TUG-3s with only the first TUG-3 being considered valid and being transmitted in the radio link while the second and the third TUG-3s being considered in an unequipped condition and therefore being not transmitted so as to maintain in this way the STM-1 structure; and in Reception, reconstructing the signal with the complete regeneration of the payload, the correct AU-4 structure, of the Section Overhead without incurring any parity check violation both at Multiplex Section level and at path level, said reconstructing step further comprises steps of:

Regeneration Section termination on proper sub-STM-1 interface;

B1 computation, said B1 being a byte allocated for regeneration section error monitoring;

reconstruction of the columns multiple of two and of three with all zero stuffing bytes;

rewriting of the correct frame alignment word bytes (A1 and A2) and of the entire RSOH;

rewriting of the correct AUOH row;

rewriting of the a remote error indication byte in the Multiplex section (M1 byte) in the correct position corresponding to the $9^{th}$ row, $6^{th}$ column position of the STM-1 frame;

filing all zeros in the byte corresponding to the position in the $9^{th}$ row, $4^{th}$ column of the frame;

AU-4 pointer interpretation;

rewriting of the TU-3 pointers for the second and third unequipped VC-3s as valid pointers and pointer offset equal to zero;

B2 byte processing, the B2 byte being allocated for multiplex section error monitoring function; and RSOH and B1 insertion, the B1 byte being allocated for regeneration section error monitoring.

8. A computer readable medium having a program recorded thereon, said computer readable medium comprising code adapted to perform steps of:

receiving the STM-1 signal or the sub-STM-1 signal; and regenerating the received signal by a radio network element the step of providing a radio network element (NE), wherein the step of providing a radio network element (NE) comprises the step of providing a pure regenerator network element, without performing any multiplexing function, wherein said step of regenerating the received signal comprises the steps of:

in Transmission, reducing by one third the received STM-1 signal, said received STM-1 signal comprising three TUG-3s with only the first TUG-3 being considered valid and being transmitted in the radio link while the second and the third TUG-3s being considered in an unequipped condition and therefore being not transmitted so as to maintain in this way the STM-1 structure; and in Reception, reconstructing the signal with the complete regeneration of the payload, the correct AU-A structure, of the Section Overhead without incurring any parity check violation both at Multiplex Section level and at path level, said reconstructing step further comprises steps of:

Regeneration Section termination on proper sub-STM-1 interface;

B1 computation, said B1 being a byte allocated for regeneration section error monitoring;

reconstruction of the columns multiple of two and of three with all zero stuffing bytes;

rewriting of the correct frame alignment word bytes (A1 and A2) and of the entire RSOH;

rewriting of the correct AUOH row;

rewriting of the a remote error indication byte in the Multiplex section (M1 byte) in the correct position corresponding to the $9^{th}$ row, $6^{th}$ column position of the STM-1 frame;

filing all zeros in the byte corresponding to the position in the $9^{th}$ row, $4^{th}$ column of the frame;

AU-4 pointer interpretation;

rewriting of the TU-3 pointers for the second and third unequipped VC-3s as valid pointers and pointer offset equal to zero;

B2 byte processing, the B2 byte being allocated for multiplex section error monitoring function; and RSOH and B1 insertion, the B1 byte being allocated for regeneration section error monitoring.

9. A method according to claim 1, wherein the sub-STM-1 signal provides one third of a capacity of the STM-1 signal.

10. A device according to claim 6, wherein the sub-STM-1 signal provides one third of a capacity of the STM-1 signal.

* * * * *